(12) United States Patent
Austin et al.

(10) Patent No.: US 10,952,411 B2
(45) Date of Patent: Mar. 23, 2021

(54) METHOD, SYSTEM AND APPARATUS FOR DETECTING WHEN AN ANIMAL IS IN HEAT

(71) Applicant: Bullcall Limited, Blackrock (IE)

(72) Inventors: Niall Austin, Birr (IE); Emmet Savage, Dubin (IE); John Larkin, Booterstown (IE)

(*) Notice: Subject to any disclaimer, the term of this patent is extended or adjusted under 35 U.S.C. 154(b) by 0 days.

(21) Appl. No.: 16/338,244

(22) PCT Filed: Oct. 2, 2017

(86) PCT No.: PCT/EP2017/075011
§ 371 (c)(1),
(2) Date: Mar. 29, 2019

(87) PCT Pub. No.: WO2018/060524
PCT Pub. Date: Apr. 5, 2018

(65) Prior Publication Data
US 2020/0029534 A1 Jan. 30, 2020

(30) Foreign Application Priority Data
Sep. 30, 2016 (GB) .................................. 1616688

(51) Int. Cl.
*A01K 29/00* (2006.01)
*A61D 17/00* (2006.01)
*A01K 11/00* (2006.01)

(52) U.S. Cl.
CPC .......... *A01K 29/005* (2013.01); *A61D 17/002* (2013.01); *A61D 17/004* (2013.01); *A01K 11/006* (2013.01)

(58) Field of Classification Search
CPC .. A01K 11/006; A01K 29/005; A61D 17/002; A61D 17/004
See application file for complete search history.

(56) References Cited

U.S. PATENT DOCUMENTS

| | | | |
|---|---|---|---|
| 9,538,730 B1* | 1/2017 | Torres | A01K 29/005 |
| 2008/0066693 A1* | 3/2008 | Bocquier | A01K 21/00 119/859 |
| 2008/0128486 A1* | 6/2008 | Lowe | A01K 29/00 235/376 |
| 2017/0367305 A1* | 12/2017 | Castro Lisboa | A61D 17/002 |
| 2018/0146645 A1* | 5/2018 | Arbel | A01K 11/006 |

* cited by examiner

*Primary Examiner* — Sisay Yacob
(74) *Attorney, Agent, or Firm* — Michael T. Abramson; Holland & Knight LLP

(57) ABSTRACT

This invention relates to a method, system and apparatus for detecting when an animal is in heat. The invention further relates to a method of alerting a responsible individual that the animal is in heat. The method for detecting when an animal is in heat comprises the steps of, using a sensor mounted on a bull, monitoring the activity of the bull in the proximity of the animal. Thereafter, the activity of the bull is analysed before finally it is determined, based on the analysed activity of the bull, whether or not the animal is in heat. The invention shifts the focus from the animal, such as a cow, to the bull and leans on the natural instincts of the bull to determine when the cow is in heat. By implementing such a system, a more reliable and/or less expensive system than many of the existing offerings is provided.

26 Claims, 5 Drawing Sheets

METHOD, SYSTEM AND APPARATUS FOR DETECTING WHEN AN ANIMAL IS IN HEAT

CROSS-REFERENCE TO RELATED APPLICATIONS

This application is a U.S. National Stage of International Patent Application No. PCT/EP2017/075011, filed 2 Oct. 2017, which claims priority to Great Britain Patent Application No: 1616688.6, filed 30 Sep. 2016, the disclosure of which is incorporated herein by reference in its entirety.

TECHNICAL FIELD

This invention relates to a method, system and apparatus for detecting when an animal is in heat.

BACKGROUND ART

The present invention is particularly suited, although not limited solely to, detecting when a cow is in heat. For simplicity, the invention will be described in terms of detecting when a cow is in heat however it will be understood that the invention may be used with other animals such as horses and the like.

Accurate detection of when a cow is in heat is fundamental to the efficient management of a herd. In the northern hemisphere, it is preferable for cows to be calving in February or March in order to maximise the use of grass to feed the cows and the weaned calves. As the typical gestation period for cows is approximately 283 days, it is therefore important to ensure that the cows are impregnated in or around May or June of the preceding year. In order to achieve this, it is important to accurately detect when a cow is in heat so that the cow may be impregnated.

The complete reproductive cycle of a cow lasts approximately 21 days, and the cow is in estrus, i.e. that period when they are receptive to a mate, for a period of approximately 12 hours. If this relatively narrow window to inseminate the cow is missed, the farmer will have to wait for approximately 21 days before they get another opportunity to have the cow inseminated. In dairy herds, cows produce milk for about 10 months after a calf is born. The cows produce the best and cheapest milk when they have good access to grass/feed. The farmer will milk the cows for 10 months, then dry the cows off and give them 2 months rest before the cows give birth again; then the cycle continues. If a dairy farmer misses a cow's heat, come dry off time for the herd, he will have milked that animal for 21 days less than the others and the farmer has to decide whether or not to continue milking the cow (i.e. to maximise revenue and disrupt the process) or to dry the cow with the rest of the herd. At present values, an average cow produces 240 euro of milk every 21 days, hence this is the value potentially lost by the farmer.

Various devices have been proposed to detect when a cow is in heat. For example, one such device is the Heat Seeker (Registered Trade Mark®) sold by Beacon Heat Detectors Pty Limited of Muswellbrook, New South Wales, Australia. This device comprises a self-adhesive patch that may be mounted on the rump of the animal. The patch is provided with a pressure-activated capsule that will rupture if pressure is applied thereto and will cause the patch to change colour, indicating that the cow is potentially in heat. Another device provided by Beacon Heat Detectors Pty Limited is the ScratchE® which comprises a self-adhesive patch that has a sacrificial top layer that may be rubbed off to expose a colourful under-layer. In both cases, the devices are activated by mounting activity of herd mates. Although useful and relatively inexpensive when compared with some of the other solutions, these devices may be prone to false alarms, may lack accuracy and require regular on-site monitoring of the animals.

A similar device to the Heat Seeker® and the ScratchE® is the bull chin collar as described in U.S. Pat. No. 3,842,802. This is a device mounted on a bull that uses a paint ball to mark the cow when the mounts the cow. However, this device is prone to false alarms, may lack accuracy, requires regular on-site monitoring of the animals and requires regular access to the bull.

Other devices operate by monitoring the activity levels of the cow. It is well known that a cow in heat walks more than a cow that is not in heat. Accordingly, it is known to place a pedometer on each of the cows in a herd to track the cows' activity. The data is then captured in a base station twice a day when the cows are led in to be milked and the data is relayed to a computer where it may be processed. Cows that are in heat may be identified and inseminated. One such system is that sold under the brand AfiAct II® by Afimilk Limited of Kibbutz Afikim, Israel. Although also useful, there is a difficulty in that it is necessary to place a pedometer on each of the cows in the herd and this can result in considerable capital expenditure for the farmer. Also, this detection methodology is rather crude and generally speaking is not highly accurate.

Another heat detection product sold by Afimilk Limited is their Silent Herdsman® which comprises a smart collar worn around the neck of the cow. The smart collar may be used to monitor the heat expression of the animal. Another smart collar device worn by a cow and used for heat detection is the Moo Monitor+® as sold by Dairymaster Limited of Tralee, Ireland. Another still smart collar device worn by a cow and used for heat detection is the Heatime® HR system as sold by SCR of Netanya, Israel. Although useful and effective, there is a problem with these devices in that an intelligent collar must be placed on each of the animals in the herd and this can result in considerable expense and greater computational burden.

One alternative offering is the Herd Navigator® as sold by DeLaval Group of Tumba, Sweden. This offering samples milk from each cow in the herd for progesterone levels in the milk. From this, it is possible to predict with good accuracy whether or not a cow is in heat. The Herd Navigator® forms part of a larger, more comprehensive dairy management system and would be considered to be a relatively expensive solution.

More recently, a number of systems and methods have been proposed that monitor the actions of a bull as well as the animal and more specifically the interactions between the bull and the animal. For example, PCT Patent Application Publication No. PCT/EP2016/103079 in the name of Castro Lisboa et al, US Patent Application Publication No. US2008/128486 in the name of Breedcare, PCT Patent Application Publication No. WO03/045273 in the name of De Boer and U.S. Pat. No. 4,503,808 in the name of McAlister all disclose systems and method for monitoring the interaction between a bull and an animal. Although an improvement on many of the existing offerings, there is a desire to improve the accuracy of the known devices and minimise the number of false alarms generated by some of the known devices. False alarms are a continuing source of annoyance to the farmer as they result in the waste of valuable and scarce resources.

It is an object of the present invention to provide a method, system and apparatus for detecting when an animal is in heat that overcomes at least some of the above-mentioned problems. It is a further object of the present invention to provide a method, system and apparatus for detecting when an animal is in heat that is accurate, relatively inexpensive and that offers a useful choice to the consumer.

SUMMARY OF INVENTION

According to the invention there is provided a method of detecting when an animal is in heat comprising the steps of:
- using a proximity sensor mounted on a bull and a proximity sensor target mounted on the animal, determining when the bull is in proximity to the animal;
- calculating the period of time that the bull and the animal are in proximity to each other;
- using an activity sensor mounted on the bull, monitoring the activity of the bull and determining when the bull is resting and when the bull is working;
- analysing the activity of the bull over the period of time that the bull is calculated to be in proximity to the animal; and
- determining, based on the combination of:
  (i) the period of time that the bull and the animal are in proximity to each other, and
  (ii) the amount of time that the bull is working when the bull and the animal are in proximity to each other,
  whether or not the animal is in heat.

By having such a method, it will be possible to predict with great accuracy whether or not an animal is in heat. This is achieved in large part by relying on the bull's natural instincts to predict when the cow is in heat. The method according to the invention closely monitors the bull's activities and from this, can determine with a good deal of accuracy whether or not the cow is in heat. Instead of mounting expensive monitoring equipment on each animal in the herd (which may extend to several hundred heads in the herd), it is possible to mount the more complex monitoring equipment on the bull. This will help to significantly reduce the cost and complexity of implementing the method. Importantly, by implementing such a method in which both the period of time that the bull and the animal are in proximity to each other and the amount of the time that the bull is working (i.e. either walking or grazing) when the bull and the animal are in proximity to each other, it has been found that a far more accurate method with less false alarms is provided. By ensuring that the bull is active for a given period of time when the bull and the animal are recorded as being in contact, this has been shown to increase the accuracy and reliability of the method considerably, reducing false alarms in the process.

In one embodiment of the invention there is provided a method of detecting when an animal is in heat in which the method determines that the animal is in heat if the period of time that the bull and the animal are in proximity to each other is of the order of 60 minutes and the bull has been working for of the order of greater than 80% of the time that the bull and the animal are in proximity to each other. This is seen as a relatively accurate measure of whether or not the animal is in heat. If the bull has spent of the order of 60 minutes in the presence of the animal (which is not necessarily continuous and the 60 minutes may be spread out over a longer period of time) and at the same time the bull has been active in that 60 minute period for at least 80% of the time, this is a reliable indicator that the animal is in heat.

In one embodiment of the invention there is provided a method of detecting when an animal is in heat in which the method determines that the animal is in heat if the period of time that the bull and the animal are in proximity to each other is of the order of 90 minutes and the bull has been working for of the order of greater than 60% of the time that the bull and the animal are in proximity to each other. It has been found that the longer that the bull and the animal are in close proximity to each other, the lower the threshold for bull activity is required in order to accurately predict that the animal is in heat. If the bull and the animal are in close proximity for of the order of 90 minutes over a period of time and the bull is active for 60% of the time, this is also a reliable indicator that the animal is in heat.

In one embodiment of the invention there is provided a method of detecting when an animal is in heat in which the method determines that the animal is in heat if the period of time that the bull and the animal are in proximity to each other is of the order of 120 minutes and the bull has been working for of the order of greater than 30% of the time that the bull and the animal are in proximity to each other. Again, it has been determined that even lower activity levels are indicative of the animal being in heat provided that the bull is in close proximity to the animal for of the order of 120 minutes.

In one embodiment of the invention there is provided a method of detecting when an animal is in heat in which the step of determining whether or not the animal is in heat comprises reducing the amount of time that the bull will have to be working when the bull and the animal are in proximity to each other, based on the longer the period of time that the bull and the animal are in proximity to each other.

In one embodiment of the invention there is provided a method of detecting when an animal is in heat in which the step of determining when the bull is working comprises determining when the bull is walking or grazing. It has been found that when a bull is interested in an animal, the bull will often be in close proximity to the animal and indeed the animal may follow the bull around field for a substantial period of time while the bull is carrying out normal activities such as grazing or walking. This technique obviates false alarms when the animals may be in close proximity to each other but the bull is inactive such as when the bull is asleep or ruminating. In those circumstances, the bull is not displaying behaviour indicative that it is interested in mating with the animal and that the animal is in heat.

In one embodiment of the invention there is provided a method of detecting when an animal is in heat in which the step of determining when the bull is resting comprises determining when the bull is neither walking nor grazing.

In one embodiment of the invention there is provided a method of detecting when an animal is in heat in which the step of using an activity sensor mounted on the bull to monitor the activity of the bull comprises using an activity sensor mounted on a collar worn by the bull to detect movement of the bulls neck upwards or downwards in a substantially vertical direction. This is seen as a particularly simple and effective way of determining whether or not the bull is active (i.e. working) or resting. The neck and by extension the head movements of the bull as it walks and grazes may be determined with a relatively simple arrangement of accelerometer or gyroscope to determine when the bulls head rises up or dips down such as when feeding or walking.

In one embodiment of the invention there is provided a method of detecting when an animal is in heat in which the step of calculating the period of time that the bull and the animal are in proximity to each other comprises the steps of:

> creating a record for the animal of the period of time that the bull and the animal are in proximity to each other the first time in a monitoring session that the bull and the animal are determined to be in proximity to each other;
>
> and thereafter, the next time that the bull and the animal are determined to be in proximity to each other, calculating the amount of time that has elapsed since the last time that the bull and the animal were determined to be in proximity to each other and if the amount of time that has elapsed since the last time that the bull and the animal were determined to be in proximity to each other is below a first threshold, adding that elapsed amount of time to the record of the period of time that the bull and the animal are in proximity to each other.

In this way, a cumulative record of the length of time that the bull and the animal spend together is kept. If there are proximity detections within a fixed time period of each other, this is indicative that the animals have remained in close proximity to each other over this time and the interaction between the animals is treated as such, namely that they have remained in close proximity to each other between successive proximity detections.

In one embodiment of the invention there is provided a method of detecting when an animal is in heat in which on the amount of time that has elapsed since the last time that the bull and the animal were determined to be in proximity to each other exceeds the time threshold, the method comprises the step of resetting the record for the animal and starting a timer once more the next time that the bull and the animal are determined to be in proximity to each other. In this way, the bull may show some interest in the animal but the animal may not be ready, in which case the bull may turn its attentions elsewhere. If so, after a certain amount of time, the clock will effectively be reset so that a more accurate method of detection is provided.

In one embodiment of the invention there is provided a method of detecting when an animal is in heat in which on the amount of time that has elapsed since the last time that the bull and the animal were determined to be in proximity to each other exceeds the time threshold, the method comprises the step of gradually decrementing the value in the record of the period of time that the bull and the animal are in proximity to each other until the next time that the bull and the animal are determined to be in proximity to each other. Similarly, if the animal is not ready to receive the bull, the bull may turn its attentions elsewhere and come back to the animal in due course. In those instances, if there is a substantial period of time of separation between the animal and the bull, the time value that the bull and the animal have already spent together will gradually be decremented so that if a substantial period of time elapses, the time value will gradually decrease to zero. This is an indicator that the animal was not yet in heat and the timer will reduce to zero until such time that the bull regains interest in the animal when the animal comes into heat.

In one embodiment of the invention there is provided a method of detecting when an animal is in heat in which the step of determining when the bull is resting and when the bull is working comprises averaging the activity of the bull over a first time window and comparing the averaged value against a threshold value. For example, the activity of the bull may be monitored over a five minute window and the activity level may be averaged over that five minute window. The result is compared with the threshold value and if the averaged value exceeds the threshold value, the bull is determined to be active at that time.

In one embodiment of the invention there is provided a method of detecting when an animal is in heat in which the step of analysing the activity of the bull further comprises detecting a mounting event of the bull and the step of determining whether or not the animal is in heat further comprises detecting at least one mounting event of the bull. This, in addition to monitoring the other activities of the bull and the proximity of the bull and the animal, provides a more accurate method of detection of when an animal is in heat.

In one embodiment of the invention there is provided a method of detecting when an animal is in heat in which the step of determining whether or not the animal is in heat comprises detecting three or more mounting events of the bull. Once three mounting attempts have been recorded, this is a strong indicator that the animal is in heat, thereby providing a very reliable method.

In one embodiment of the invention there is provided a method of detecting when an animal is in heat in which the step of detecting a mounting event of the bull comprises detecting dismounting of the bull from the animal. It is believed that the detection of the dismounting may be more reliable and straightforward to detect as it tends to involve more sudden movements than the mounting movements. This may be done using an accelerometer or a gyroscope or indeed some device to detect the sudden drop of the bull off the animal.

In one embodiment of the invention there is provided a method of detecting when an animal is in heat in which the step of detecting dismounting of the bull from the animal comprises detecting the return of the bull's front hooves to the ground. There are a number of ways in which this can be achieved. For example, a pressure sensor, a proximity sensor or other like sensor could be provided that could detect the proximity of the bull's hooves to the ground.

In one embodiment of the invention there is provided a method of detecting when an animal is in heat in which the step of analysing the activity of the bull further comprises detecting an insemination attempt by the bull and the step of determining whether or not the animal is in heat further comprises detecting an insemination attempt by the bull. Again, this, in addition to monitoring the other activities of the bull and the mutual proximity of the bull and the animal, provides an even more accurate method of detection of when an animal is in heat. This is seen as a highly advantageous aspect of the present invention. If an insemination attempt by the bull is detected, this will provide almost complete certainty to the farmer/breeder that the animal is in estrus. If the bull has been vasectomized, the animal can be artificially inseminated shortly thereafter.

In one embodiment of the invention there is provided a method of detecting when an animal is in heat in which the step of detecting an insemination attempt by the bull comprises detecting a jump by the bull during a mounting event. This is seen as a relatively simple way of detecting an insemination attempt by the bull. It is envisaged that the jump may be detected in a number of ways, for example by monitoring a change in the strength of the signal received by a proximity reader and/or by monitoring a certain pattern in the output of an accelerometer and/or a gyroscope and/or a tilt switch.

In one embodiment of the invention there is provided a system for detecting when an animal is in heat comprising:

> a proximity sensor target for mounting on the animal; and
> a sensor unit for mounting on a bull, the sensor unit
>> comprising: a proximity sensor for detecting the proximity sensor target; a power supply; an activity sensor operable to detect when the bull is resting and when the bull is working; a processor; and a communication unit for communications with a remote receiver.

By having such a system, it will be possible to predict with great accuracy whether or not an animal is in heat and it will be possible to do so at a fraction of the cost and the complexity of many of the existing offerings. The system relies on the bull's natural instincts to predict when the cow is in heat. The system according to the invention closely monitors the bull's activities and from this, it can be determined with a good deal of accuracy whether or not the cow is in heat. Instead of mounting expensive monitoring equipment on each animal in the herd, it is possible to mount the majority of the monitoring equipment on the bull and simply provide proximity sensor targets on the animals. The proximity sensor targets are relatively inexpensive devices to provide and can be worn as an ear tag or other like device. The overwhelming majority of the intelligence in the system is in the sensor unit worn by the bull. This will help to significantly reduce the cost and complexity of the system. By monitoring the activity of the bull and determining whether the bull is working (i.e. active) or at rest, this information may be used along with the proximity information to provide a more reliable system.

In one embodiment of the invention there is provided a system for detecting when an animal is in heat in which the activity sensor operable to detect when the bull is resting and when the bull is working comprises a sensor configured to detect movement of the bulls neck upwards or downwards in a substantially vertical direction. This is seen as a particularly simple and inexpensive way of determining whether or not the bull is working or resting.

In one embodiment of the invention there is provided a system for detecting when an animal is in heat in which the sensor unit comprises means for detecting a mounting event.

In one embodiment of the invention there is provided a system for detecting when an animal is in heat in which the means for detecting a mounting event comprise means for detecting dismounting of the bull from the animal.

In one embodiment of the invention there is provided a system for detecting when an animal is in heat in which the sensor unit comprises means for detecting an insemination attempt by the bull.

In one embodiment of the invention there is provided a system for detecting when an animal is in heat in which the means for detecting an insemination attempt by the bull comprises means for detecting a jump by the bull during a mounting event.

In one embodiment of the invention there is provided a collar for a bull comprising a sensor unit, the sensor unit comprising: a proximity sensor for detecting a proximity sensor target mounted on another animal; a power supply; an activity sensor operable to detect when the bull is resting and when the bull is working; a processor; and a communication unit for communications with a remote receiver.

By having such a collar, it will be possible to predict with great accuracy whether or not an animal is in heat and it will be possible to do so at a fraction of the cost and the complexity of many of the existing offerings. The apparatus relies on the bull's natural instincts to predict when the cow is in heat. The collar according to the invention closely monitors the bull's activities and from this, it can be determined with a good deal of accuracy whether or not a cow in close proximity to the bull is in heat as well as whether or not the bull is active at that time. Instead of mounting expensive monitoring equipment on each animal in the herd, it is possible to mount the collar with the monitoring equipment on the bull and inexpensive proximity sensor targets on the animals. This will help to significantly reduce the cost and complexity of the system. Furthermore, a collar will allow for the advantageous placement of the monitoring equipment, particularly proximity sensors, around the neck of the bull. It will be relatively straightforward to mount the collar onto a bull and will limit the discomfort to the bull. The bull will be practically oblivious to the presence of the collar and the monitoring equipment.

In one embodiment of the invention there is provided a collar for a bull in which the activity sensor operable to detect when the bull is resting and when the bull is working comprises a sensor configured to detect movement of the bulls neck upwards or downwards in a substantially vertical direction. This may be provided by way of one or more accelerometers, a multi-axis accelerometer, a tilt switch and/or a gyroscope.

In one embodiment of the invention there is provided a collar for a bull in which there are provided a pair of proximity sensors spaced apart from each other along the collar for placement of one of the proximity sensors on each side of the bull's neck. By having the proximity sensors on either side of the collar on the bulls neck, a more reliable device will be provided as the bulls mass will not prevent detection of a proximity sensor target on an animal.

BRIEF DESCRIPTION OF THE DRAWINGS

The invention will now be more clearly understood from the following description of some embodiments thereof given by way of example only with reference to the accompanying drawings, in which.

DETAILED DESCRIPTION OF THE DRAWINGS

Figure 1:
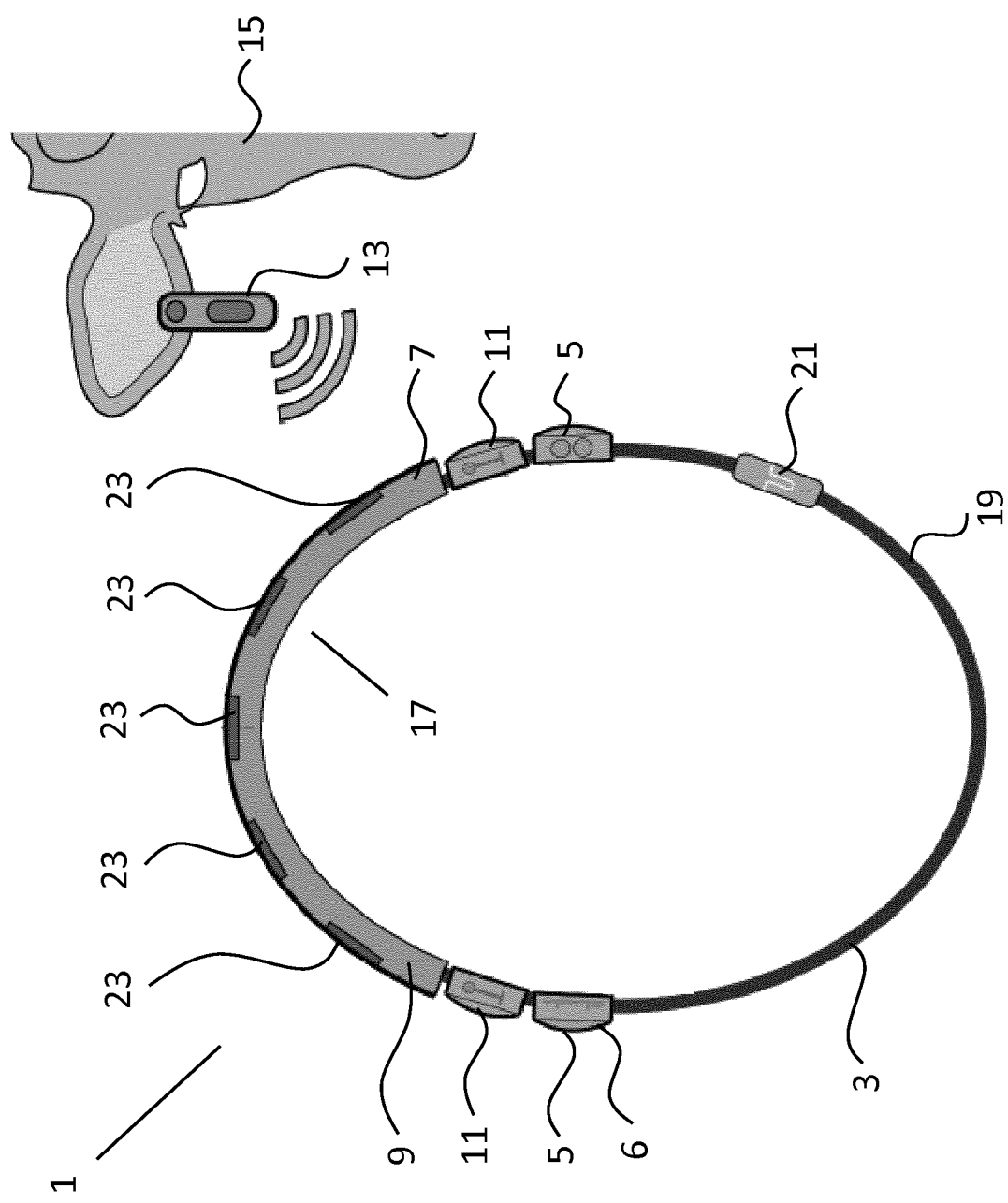
FIG. 1 is a diagrammatic representation of a system for detecting when an animal is in heat according to the invention.

Referring to FIG. 1, there is shown a diagrammatic representation of a system for detecting when an animal is in heat, indicated generally by the reference numeral 1. The system 1 comprises a collar 3 for mounting on a bull (not shown) having a proximity sensor 5, an activity sensor 6, a power supply 7, a processor 9 and a communication unit 11 for communications with a remote receiver (not shown). The system further comprises a proximity sensor target 13 for mounting on an animal 15, in this case a cow.

The collar 3 comprises a saddle portion 17, a flexible strap portion 19 and a quick release buckle 21 for connecting two ends of the flexible strap portion 19 together, thereby securing the collar in a continuous loop. The saddle portion 17 is a moulded, semi-rigid piece that is configured to stay in place on the bulls neck once mounted on the bull and prevent the collar from rotating around the bull's neck. The saddle portion is further provided with a plurality of photovoltaic arrays 23 for charging the power supply 7. It is envisaged that the environment around the bull's neck may be too harsh for the photovoltaic arrays 23 to operate adequately over time in which case, additional battery power may be provided. It is envisaged that a power supply 7 providing of the order of eight weeks worth of power between recharging/replacement of the batteries would be useful.

The proximity sensor 5 comprises a radio frequency identification (RFID) reader and the proximity sensor target 13 comprises an RFID tag, in this case a passive RFID tag. The operation of the RFID reader and the passive RFID tag is well known in the art and further detailed description is not deemed necessary here. Generally speaking, the RFID reader emits an electromagnetic field and passive RFID tags in the vicinity of the RFID reader will be excited by the electromagnetic field, causing the passive RFID tag to emit a signal containing a unique identifier of the RFID tag. That unique identifier is "read" by the RFID reader and in this way, the RFID reader is aware of the presence of a particular RFID tag in the vicinity of the reader. This information may be stored in local memory (not shown) and processed locally in the processor 9 and/or relayed to a processor in a remote location (not shown) for further processing.

For example, the processor 9 may determine that the same RFID tag 13 signal with a given unique identifier has been received almost continuously or continuously for a prolonged period of time by the RFID reader 5, indicative that the cow 15 having the tag 13 in question has been in close proximity with the bull for that prolonged period of time.

The activity sensor 6 comprises an accelerometer configured to monitor the activity of the bull. More specifically, the activity sensor is configured to determine when the bull is working or at rest. This is achieved by the activity sensor monitoring the neck movements of the bull in an upwards and downwards direction. If the neck of the bull is moving upwards and downwards, this is indicative that the bull is walking or grazing, or in other words is active or "working". If the head/neck is not moving up and down, this is indicative that the bull is resting which may be sleeping or indeed ruminating. The accelerometer effectively continuously monitors the roll angle about a substantially horizontal axis through the bulls neck perpendicular to the bulls spine. The absolute value of the roll angle is determined to monitor activity of the bull. This information is combined with the proximity information of the bull and the animal to determine whether or not the bull was active when the bull and the animal were in close proximity. It has been found that if the bull and the animal have been in close proximity to each other over a prolonged period of time while the bull has been active for a large part of this time, then this is a very reliable indicator that the animal is in heat. If the bull has been inactive over this period of time when the bull and the animal are in proximity to each other, this is indicative that the animal is not in heat.

Figure 2:
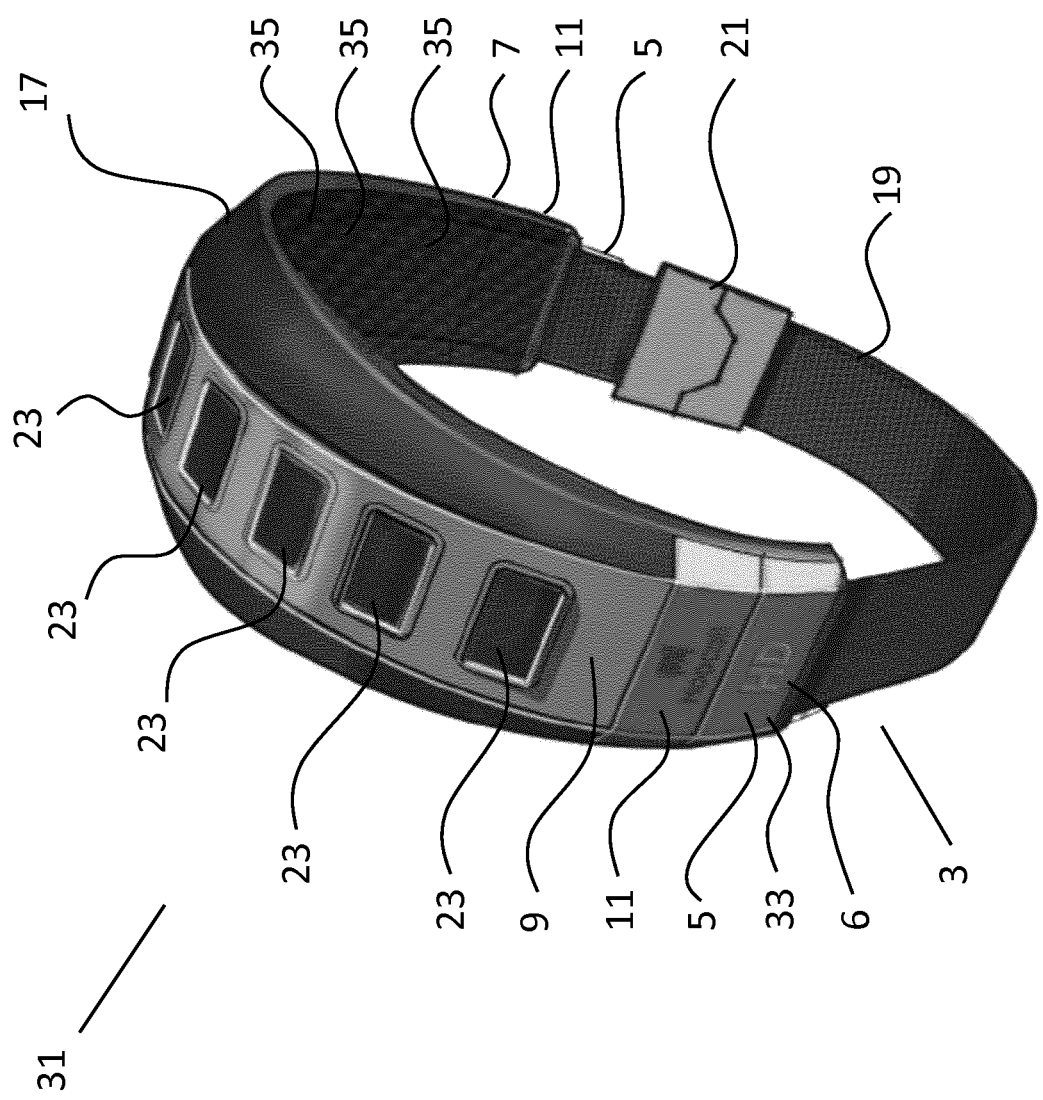
FIG. 2 is a perspective view of an alternative construction of collar forming part of the system for detecting when an animal is in heat according to the invention.
Figure 3:
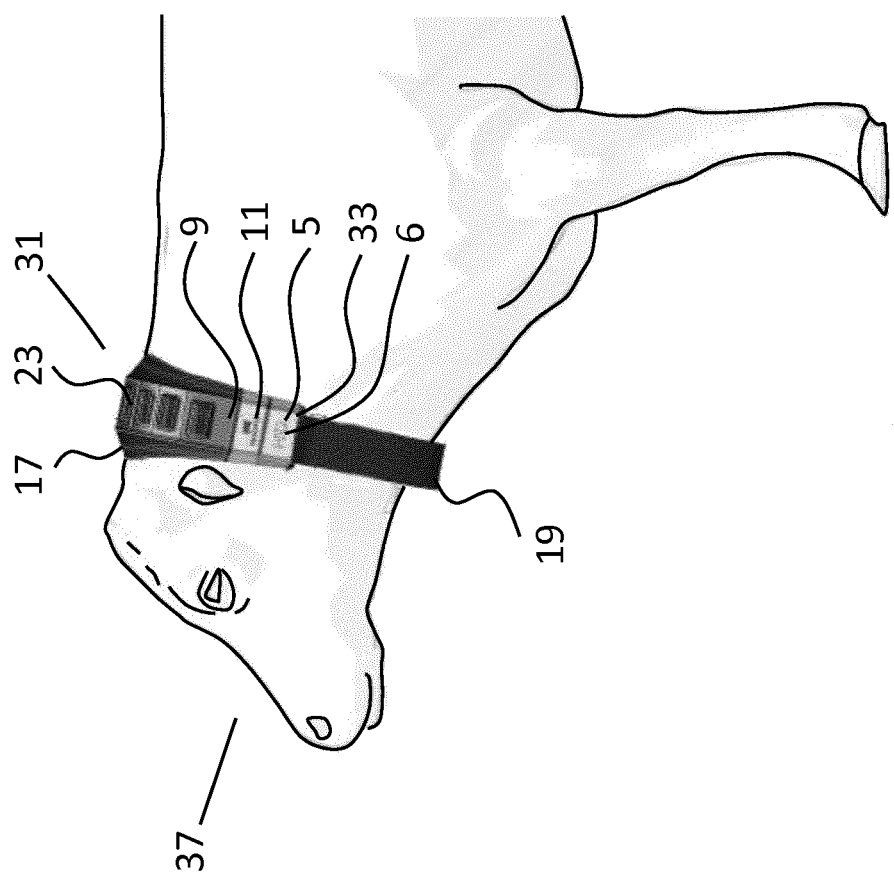
FIG. 3 is a diagrammatic representation of the collar of FIG. 2 mounted on a bull.

Referring to FIGS. 2 and 3, there is shown an alternative construction of collar for use in the system and method for detecting when an animal is in heat according to the invention, indicated generally by the reference numeral 31, where like parts have been given the same reference numeral as before. The collar 31 differs from the collar 3 in that the sensor 5 further comprises an accelerometer 33, in this case a three-axis accelerometer. The accelerometer is used to detect mounting events by a bull and also can be used to detect insemination attempts by a bull, as will be described in more detail below. Referring specifically to FIG. 2, it can be seen that the collar 31 has dimples 35 on the inner surface thereof. The dimples provide air passageways therebetween to promote airflow underneath the collar, thereby preventing sores on the animal's skin.

Referring specifically to FIG. 3, there is shown a diagrammatic view of the collar 31 mounted on a bull 37. The collar is fixed around the bull's neck by placing the saddle onto the bull's neck and thereafter clipping the two parts of the quick release buckle together. In this configuration, the collar 31 is firmly fixed to the neck of the bull 37. The saddle holds the collar in a relatively stable configuration around the neck of the bull. In this way, one of the communication units 11 will be located on one side of the bull's neck and the other of the communication units 11 will be located on the other side of the bull's neck. Similarly, one of the proximity readers 5 will be located on one side of the bull's neck and the other of the proximity readers 5 will be located on the other side of the bull's neck. In this way, the proximity readers 5 will be able to sense an RFID tag on either side of the bull and the excitation or the generated signal will not be attenuated by having to pass through the bull's neck. Similarly, the communications units 11 will be able to transmit an alert or data to a remote location.

Figure 4:
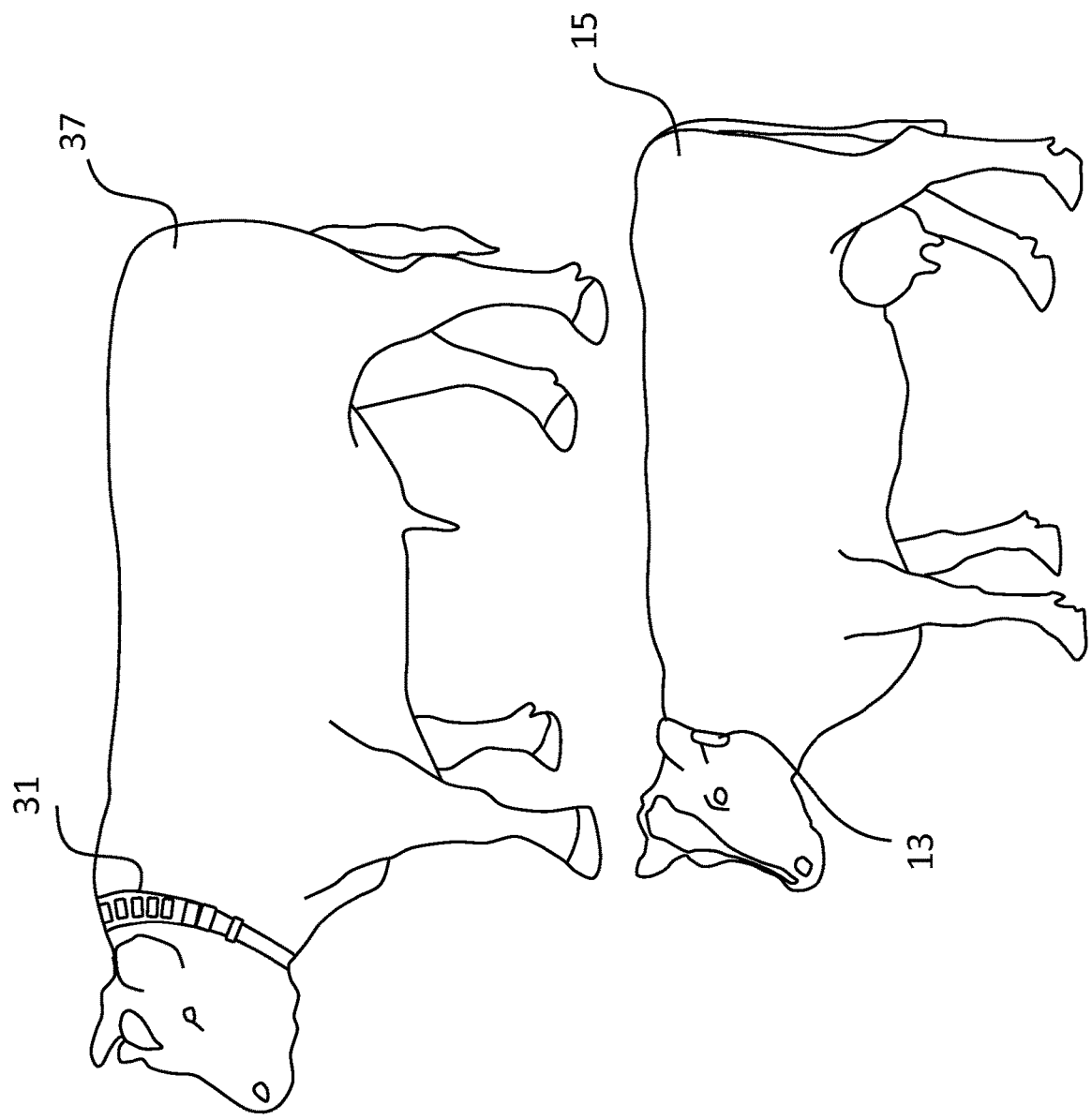
FIG. 4 is a diagrammatic representation of a bull and a cow wearing the components of the system of FIG. 1.
Figure 5:
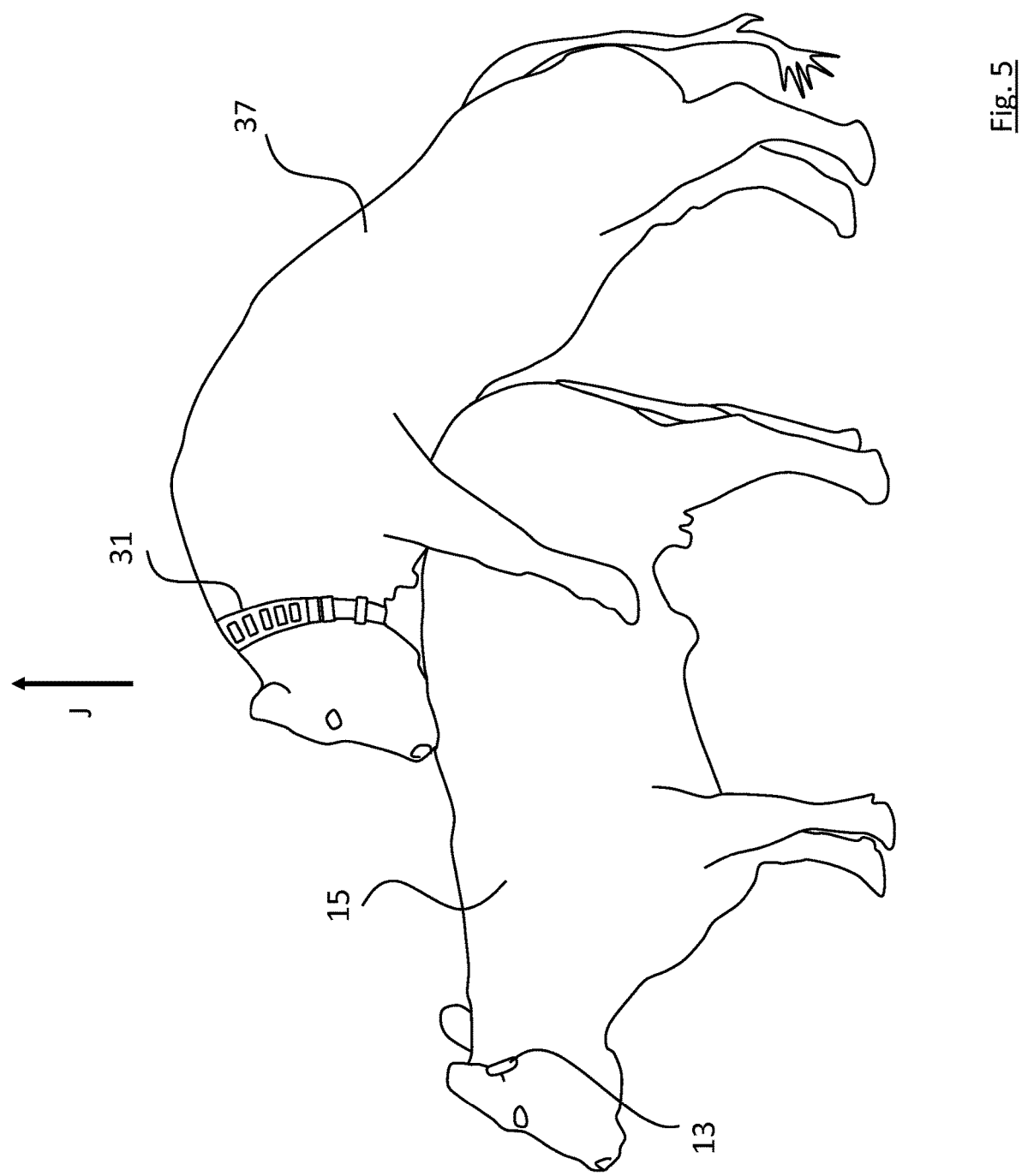
FIG. 5 is a diagrammatic representation of the bull and the cow of FIG. 4 during a mounting event.

Referring now to FIGS. 4 and 5, there is shown a pair of diagrammatic representations of a bull 37 and a cow 15 wearing the apparatus of the system 1 and the method according to the present invention. The bull 37 has a collar 31 around it's neck and the cow 15 has an ear tag with the RFID tag (i.e. the proximity reader target) therein.

Referring specifically to FIG. 4, the bull 37 and the cow 15 are shown standing in a field. It is understood that the bull 37 will stay close to the cow 15 when the cow 15 is in heat. Over this time, the bull will do a number of things to determine whether or not the cow is in heat. For example, the bull will press his chin downwards on the cow's rump or hind-quarters to see if the cow will "stand" for him or not. The bull will also sniff and nudge the cow's vulva region and the bull will tend to perform a Flehmen response in which he curls back his upper lip and nose and raises his head in the air. At the same time, the bull is inhaling, smelling the pheromones the cow is emitting in her urine and vaginal secretions. Using these techniques, the bull can determine when the cow is in heat.

The proximity sensor 5 in the collar 31 will detect the proximity tag 13 worn by the cow. If the proximity sensor detects the same tag for an extended period of time, for example over two hours, this is a good indication that the cow is in heat. During this time, the bull may also attempt to mount the cow, as illustrated in FIG. 5. This is referred to as a mounting event, in which the bull mounts the cow and places its front legs on the cow. If a mounting event is detected, and preferably if three or more mounting events are detected, this is a clearer indicator that the cow is in heat.

The mounting event may be detected in a number of ways. For example, an accelerometer may be used to detect a sudden rise in the bull, as would be the case as the bull rises up onto the cow. This can be verified by the proximity sensor detecting the cows RFID tag. In this way, it is known which cow is being mounted by the bull. This event can be recorded as a mounting event on that cow. Alternatively, the mounting event may be detected by a dismounting action. As the bull dismounts from the cow, the bull will come down with significant force and its foreleg hooves will come back into contact with the ground. This sudden deceleration may be detected by an accelerometer. Alternatively, the return to ground may be detected using a gyroscope or tilt switches in the sensor of the collar. In a further alternative, pressure pads or the like could be placed on the front hooves of the bull and these pressure pads could be in communication with the processor so that it is possible to determine when the hooves return to ground.

In addition to a mounting event, the bull may make an insemination attempt. While making an insemination attempt, the bull will "jump" when mounted on the cow. The general direction of the jump is illustrated as arrow J in FIG. 5. If a "jump" is detected, this provides almost certainty that the cow is in heat and ready for insemination. The "jump" may be detected using pattern recognition or other technique using one or more sensors such as an accelerometer, a gyroscope, a tilt switch and the like. One or more additional sensors may be provided on the bull to detect this "jump". For example, one or more sensors to detect the bull's hind legs leaving the ground during the "jump" may be provided.

It will be understood from the foregoing that what is important is that both the proximity of the two animals and the activity levels of the bull are monitored simultaneously and both the proximity of the two animals and the activity levels of the bull are taken into account when determining whether or not the animal is in heat. However, the proximity sensor on the bull may not, indeed typically will not, continuously read the proximity sensor target on the cow that it is pursuing over the time that the bull is pursuing the animal. The bull will also move around the animal when the animal is in heat and the sensor on the bull may not continuously record the presence of the animals tag even though the two animals are in proximity. However, the proximity sensor on the bull may detect the proximity sensor target on the animal after say, 5 minutes. In those circumstances, it is assumed that the bull and the animal were still in close proximity to each other over that five minute period.

Upon initial contact, a record for the cow is created by the processor on the bulls collar and a timer is begun. The record represents the amount of time that the bull and the animal have spent in close proximity to each other. The record may be pre-loaded with an arbitrary time period, of say 5 minutes, if desired after the first contact. When the next contact is made, after say, 7 minutes, the value in the record (5 minutes) is increased by 7 minutes to 12 minutes and this is the time that the animal and the bull are deemed to have been in contact. If there is a further contact detected after a further four minutes, the four minutes is added to the record and the record becomes 16 minutes. This continues until the time in the record reaches a predetermined level, for example, 60, 70, 90 or 120 minutes. The value may be chosen depending on testing, the animal in question, and/or level of accuracy required. Once the predetermined time threshold has been reached, the bull's activity levels over that time period is ascertained. Depending on the time threshold, the bull will have to have been active for a given period of time over that longer period. For example, for a time threshold of 60 or 70 minutes, it may be determined that the bull will have to have been active for at least 80% of the time for the animal to be considered to be in heat. The required level of activity will typically decrease with an increased time in which the animal and the bull are considered to be in close proximity so that for a time period of 90 minutes, it may be sufficient that the bull was active for 60% of the time and for a time period of 120 minutes, it may be sufficient that the bull was active for of the order of 30% of the total time. The above values of time and activity levels have been shown to provide accurate detection of heat in cows. Other animals may differ but the general principle is believed to hold.

If the animal and the bull do not record any contact with each other for an extended predetermined period of time, the method may entail resetting the time in the record for the animal back to zero or other initial value. Alternatively, if the animal and the bull do not record any contact with each other for an extended predetermined period of time, instead of resetting the record, the value in the record may be gradually reduced by decrementing the value in the record so that it will gradually reduce to zero over time if there is no further contact between the animal and the bull. One equation suitable for recording the amount of time that the animal and bull are together is as follows:

$$X(t)=\{X(t-1)+t-t_{last}<\Delta T_{MAX}, k*X(t-1)+\Delta T_{MAX}, t-t_{last}\geq\Delta T_{MAX}, t-t_{last}<\Delta T_{MAX}+T_{PERIOD}, \Delta T_{MAX}, t-t_{last}\geq\Delta T_{MAX}+T_{PERIOD}\}$$

Where: $X(t)$—duration of time cow and bull has spent together $X(t-1)$—previous value of estimation $t_{LAST}$—time when last time tag is read $\Delta T_{MAX}=10$ minutes $T_{PERIOD}=60$ minutes $K$=depreciation constant In this equation, if the amount of time that the bull and the animal are separated is less than 10 minutes between interactions, the time difference between the two adjacent proximity detections will be added to the value of the record. If however the time between two adjacent proximity detections is greater than 10 minutes, the time in the record will be reduced by an amount determined in part by a depreciation constant, k, after 10 minutes has elapsed until the next detection. The depreciation constant could be set so that the time in the record will reduce to zero over a set time or over a time proportional to the amount of time in the record. As mentioned above, when the time reaches the desired value, in this case 70 minutes, a check of the activity levels of the bull over that time will be compared and if the activity level is above a predetermined amount (e.g. 80%) this will be indicative that the animal is in heat. An alert may be sent to a farmer or breeding professional if insemination is required and a notification can be sent to a breeding management software program. If the activity level is less than the predetermined amount, the time in the counter will continue to be incremented and the activity levels monitored until such time that the activity level combined with the time in close proximity are sufficient to indicate the animal being in heat. At that stage, an alert will be sent out to the farmer or breeding professional.

It will be understood that the present invention also relates to a method of alerting a responsible individual to the fact that the cow is in heat. For example, the bull may be a vasectomised bull in which case the cow will have to be artificially inseminated by a trained operative. The vasectomised bull can be used to detect the cows that are in heat and those cows can thereafter be separated from the herd and artificially inseminated. Once the system has detected that the cow is in heat, a communication is sent to a responsible individual in a remote location over, preferably, a telecommunications network. For example, a farmer and/or a breeder may be notified by a short messaging service (SMS) message or other electronic communication that a particular cow is in heat. A hand-held RFID reader or other identification means such as a standard ear tag may be used by the farmer to determine which cow is the one that he received a notification about. The farmer can then see to it that the animal is inseminated.

The present invention can also be used to detect if there are any problems with the bull or with the animals. For example, if the bull is not a vasectomised bull and it is noted that the bull covered several animals when they were in heat but that those animals did not get pregnant, this is an indicator that the bull is no longer fertile or that there are fertility problems with the bull rather than the animals. Similarly, if the bull covered several animals and one did not get pregnant, this could be an indicator that the animal has fertility issues.

In this specification the terms "comprise, comprises, comprised and comprising" and the terms "include, includes, included and including" are all deemed totally interchangeable and should be afforded the widest possible interpretation. The invention is in no way limited to the embodiments hereinbefore described but may be varied in both construction and detail within the scope of the appended claims.

The invention claimed is:

1. A method of detecting when an animal is in heat comprising the steps of:
    using a proximity sensor mounted on a bull and a proximity sensor target mounted on the animal, determining when the bull is in proximity to the animal;
    calculating the period of time that the bull and the animal are in proximity to each other;
    using an activity sensor mounted on the bull, monitoring the activity of the bull while the bull is not mounting the animal and determining when the bull is resting and when the bull is walking or grazing;
    analysing the activity of the bull over the period of time that the bull is calculated to be in proximity to the animal while the bull is not mounting the animal; and
    determining, based on the combination of:
        (i) the period of time that the bull and the animal are in proximity to each other, and
        (ii) the amount of time that the bull is walking or grazing when the bull and the animal are in proximity to each other,
    whether or not the animal is in heat.

2. The method of detecting when an animal is in heat as claimed in claim 1, in which the method determines that the animal is in heat if the period of time that the bull and the animal are in proximity to each other is of the order of 60 minutes and the bull has been working for of the order of greater than 80% of the time that the bull and the animal are in proximity to each other.

3. The method of detecting when an animal is in heat as claimed in claim 1, in which the method determines that the animal is in heat if the period of time that the bull and the animal are in proximity to each other is of the order of 90 minutes and the bull has been working for of the order of greater than 60% of the time that the bull and the animal are in proximity to each other.

4. The method of detecting when an animal is in heat as claimed in claim 1, in which the method determines that the animal is in heat if the period of time that the bull and the animal are in proximity to each other is of the order of 120 minutes and the bull has been working for of the order of greater than 30% of the time that the bull and the animal are in proximity to each other.

5. The method of detecting when an animal is in heat as claimed in claim 1, in which the step of determining whether or not the animal is in heat comprises reducing the amount of time that the bull will have to be working when the bull and the animal are in proximity to each other, based on the longer the period of time that the bull and the animal are in proximity to each other.

6. The method of detecting when an animal is in heat as claimed in claim 1, in which the step of determining when the bull is resting comprises determining when the bull is neither walking nor grazing.

7. The method of detecting when an animal is in heat as claimed in claim 1, in which the step of using an activity sensor mounted on the bull to monitor the activity of the bull comprises using an activity sensor mounted on a collar worn by the bull to detect movement of the bulls neck upwards or downwards in a substantially vertical direction.

8. The method of detecting when an animal is in heat as claimed in claim 1, in which the step of calculating the period of time that the bull and the animal are in proximity to each other comprises the steps of:
    creating a record for the animal of the period of time that the bull and the animal are in proximity to each other the first time in a monitoring session that the bull and the animal are determined to be in proximity to each other;
    and thereafter, the next time that the bull and the animal are determined to be in proximity to each other, calculating the amount of time that has elapsed since the last time that the bull and the animal were determined to be in proximity to each other and if the amount of time that has elapsed since the last time that the bull and the animal were determined to be in proximity to each other is below a first threshold, adding that elapsed amount of time to the record of the period of time that the bull and the animal are in proximity to each other.

9. The method of detecting when an animal is in heat as claimed in claim 8, in which on the amount of time that has elapsed since the last time that the bull and the animal were determined to be in proximity to each other exceeds the time threshold, the method comprises the step of resetting the record for the animal and starting a timer once more the next time that the bull and the animal are determined to be in proximity to each other.

10. The method of detecting when an animal is in heat as claimed in claim 8, in which on the amount of time that has elapsed since the last time that the bull and the animal were determined to be in proximity to each other exceeds the time threshold, the method comprises the step of gradually decrementing the value in the record of the period of time that the bull and the animal are in proximity to each other until the next time that the bull and the animal are determined to be in proximity to each other.

11. The method of detecting when an animal is in heat as claimed in claim 1, in which the step of determining when the bull is resting and when the bull is working comprises averaging the activity of the bull over a first time window and comparing the averaged value against a threshold value.

12. The method of detecting when an animal is in heat as claimed in claim 1, in which the step of analysing the activity of the bull further comprises detecting a mounting event of the bull and the step of determining whether or not the animal is in heat further comprises detecting at least one mounting event of the bull.

13. The method of detecting when an animal is in heat as claimed in claim 12, in which the step of determining whether or not the animal is in heat comprises detecting three or more mounting events of the bull.

14. The method of detecting when an animal is in heat as claimed in claim 12, in which the step of detecting a mounting event of the bull comprises detecting dismounting of the bull from the animal.

15. The method of detecting when an animal is in heat as claimed in claim 14, in which the step of detecting dismounting of the bull from the animal comprises detecting the return of the bull's front hooves to the ground.

16. The method of detecting when an animal is in heat as claimed in claim 1, in which the step of analysing the activity of the bull further comprises detecting an insemination attempt by the bull and the step of determining whether or not the animal is in heat further comprises detecting an insemination attempt by the bull.

17. The method of detecting when an animal is in heat as claimed in claim 16, in which the step of detecting an insemination attempt by the bull comprises detecting a jump by the bull during a mounting event.

18. A system for detecting when an animal is in heat comprising:
   a proximity sensor target for mounting on the animal; and
   a sensor unit for mounting on a bull, the sensor unit comprising: a proximity sensor for detecting the proximity sensor target while the bull is not mounting the animal; a power supply; an activity sensor operable to detect when the bull is resting and when the bull is walking or grazing while the bull is not mounting the animal; a processor; and a communication unit for communications with a remote receiver.

19. The system for detecting when an animal is in heat as claimed in claim 18, in which the activity sensor operable to detect when the bull is resting and when the bull is walking or grazing comprises a sensor configured to detect movement of the bulls neck upwards or downwards in a substantially vertical direction.

20. The system for detecting when an animal is in heat as claimed in claim 18, in which the sensor unit comprises means for detecting a mounting event.

21. The system for detecting when an animal is in heat as claimed in claim 20, in which the means for detecting a mounting event comprise means for detecting dismounting of the bull from the animal.

22. The system for detecting when an animal is in heat as claimed in claim 18, in which the sensor unit comprises means for detecting an insemination attempt by the bull.

23. The system for detecting when an animal is in heat as claimed in claim 22, in which the means for detecting an insemination attempt by the bull comprises means for detecting a jump by the bull during a mounting event.

24. A collar for a bull comprising a sensor unit, the sensor unit comprising: a proximity sensor for detecting a proximity sensor target mounted on another animal while the bull is not mounting the animal; a power supply; an activity sensor operable to detect when the bull is resting and when the bull is walking or grazing while the bull is not mounting the animal; a processor; and a communication unit for communications with a remote receiver.

25. The collar for a bull as claimed in claim 24, in which the activity sensor operable to detect when the bull is resting and when the bull is working comprises a sensor configured to detect movement of the bulls neck upwards or downwards in a substantially vertical direction.

26. The collar for a bull as claimed in claim 24, in which there are provided a pair of proximity sensors spaced apart from each other along the collar for placement of one of the proximity sensors on each side of the bull's neck.

* * * * *